US006895778B1

(12) United States Patent
Ackerman (10) Patent No.: US 6,895,778 B1
(45) Date of Patent: May 24, 2005

(54) COMPARTMENTALIZED PORTABLE COOLER WITH COOLING GRADIENT

(76) Inventor: William Ackerman, 25 Fox Hill Rd., Denville, NJ (US) 07834

( * ) Notice: Subject to any disclaimer, the term of this patent is extended or adjusted under 35 U.S.C. 154(b) by 0 days.

(21) Appl. No.: 10/865,710

(22) Filed: Jun. 10, 2004

(51) Int. Cl.[7] .............................................. F25D 3/08
(52) U.S. Cl. ...................... 62/457.7; 62/371; 62/457.5
(58) Field of Search .............................. 62/371, 457.1, 62/457.5, 457.6, 457.7

(56) References Cited

U.S. PATENT DOCUMENTS

| | | | |
|---|---|---|---|
| 307,299 A | 10/1884 | Hare | |
| 450,527 A | 4/1891 | Poyner | |
| 601,798 A | 4/1898 | Slomka | |
| 1,895,864 A | 1/1933 | Ricci | |
| 1,935,307 A | 11/1933 | Ackerman | 206/4 |
| 2,496,296 A * | 2/1950 | Lobl | 62/329 |
| 3,591,194 A | 7/1971 | Vega | 280/47.26 |
| 4,286,440 A | 9/1981 | Taylor | 62/457 |
| 4,446,705 A * | 5/1984 | Loucks | 62/372 |
| 4,671,079 A | 6/1987 | Petrantoni | 62/457 |
| 5,257,509 A * | 11/1993 | Harris | 62/326 |
| 5,295,369 A | 3/1994 | Garcia | 62/389 |
| 5,509,279 A | 4/1996 | Brown et al. | 62/457.5 |
| 5,605,056 A | 2/1997 | Brown et al. | 62/457.4 |
| 6,193,097 B1 | 2/2001 | Martin Perianes | 220/592.03 |
| 6,318,740 B1 | 11/2001 | Nappo | 280/87.01 |
| 6,474,097 B2 | 11/2002 | Treppedi et al. | 62/457.7 |
| 2002/0060438 A1 | 5/2002 | Gartner et al. | 280/79.2 |

* cited by examiner

Primary Examiner—Melvin Jones
(74) Attorney, Agent, or Firm—Ernest D. Buff & Associates, LLC; Ernest D. Buff; Dave Narasimhan

(57) ABSTRACT

A portable cooler has at least three separate storage compartments that comprise at least one ice-cold storage compartment; at least one dry moderately cold storage compartment; and at least one dry non-cold storage compartment. A temperature gradient construction enables the user to proficiently store food and non-food items of varying water sensitivities and temperature needs. Typically, a wet cooling medium is added to the ice-cold storage compartment. Discrete thermal conduction pathways extend from the ice-cold storage compartment into the moderately cold storage compartment, cooling the moderately cold storage compartment. The less cold compartment and the non-cold compartment are completely dry of water. Each of the compartments has its own lid enabling selective entry and thereby preventing temperature fluctuations and moister transfer when another compartment is accessed. The portable cooler has a plurality of foldable wheels on the base thereof to facilitate portability.

22 Claims, 4 Drawing Sheets

COMPARTMENTALIZED PORTABLE COOLER WITH COOLING GRADIENT

BACKGROUND OF THE INVENTION

1. Field of the Invention

The present invention relates to a cooler having a multi-compartment gradient cooling construction and a plurality of folding wheels for easy portability; and more particularly, to a cooler having an ice-cold storage compartment, a dry moderately-cold storage compartment, and a dry non-cold storage compartment, as well as means providing for selective entry into each of the compartments and for sealing each of the compartments from the others to afford optimal cooling benefits and prevent water entry into the dry compartments.

2. Description of the Prior Art

Portable coolers used for storing food, beverages, and other perishable items are commonly utilized by consumers. The coolers heretofore devised and utilized are known to generally consist of single food storage compartments and multi-compartment cooler systems typically focusing on the separation of beverages from food items. These coolers do not provide the most optimal refrigeration, as they do not distinguish between the different temperatures and moisture sensitivities required for storing food items and non-food items. None of the heretofore disclosed coolers sets forth a cooler comprised of a multi-compartment gradient cooling construction, with wet and dry sealed compartments, with selective entry, and a plurality of folding wheels for easy portability.

Certain food items require very low, or ice-cold, temperatures to maintain their physical and nutritional properties, while also retaining or optimizing the taste of the product. Full immersion of the item in a cold medium, such as an ice and water mixture, provides efficient heat transfer from the item to the medium and thereby yields the most optimal conditions for maintaining the desirable ice-cold temperature. However, items that are not packaged in a water tight sealed condition are susceptible to absorbing and retaining moisture from the cold medium used. This result can be very debilitating to the integrity of the food item or non-food item, rendering the item inedible or useless. Furthermore, organization warrants a separate dry compartment for non-perishable food items and non-food items.

These moisture sensitive food items generally require cool temperatures in order to support their edible integrity, and are less appealing when served at ice-cold temperatures. Still additional moisture sensitive food products, and non-foot items, do not require cool temperatures, and are best kept at ambient temperatures. Advantageously, a separate compartment for these items enables the item to maintain the optimal temperature for the item, while retaining the integrity of the item by preventing undesirable moisture absorption.

One major disadvantage of several of the heretofore devised and utilized coolers is the failure to protect vulnerable non-sealed items from being exposed to, and subsequently absorbing cold medium's byproducts when in contact therewith; such byproducts may include water from melted ice, or other contaminants contained therein (salt, brine, etc.). As a result, these vulnerable items become saturated with water or other contaminants, yielding the item inedible and unappetizing; such as a waterlogged sandwich.

Another glaring disadvantage of several of the coolers heretofore devised and utilized is the availability of only one temperature for storage of items. With this cooler arrangement, the user cannot distinguish items that require ice-cold conditions from those items that do not require, and are less appetizing when stored in, ice-cold conditions. Furthermore, even where there is more than one temperature disclosed, the compartments are not completely dry and are not provided with selective entry to ensure optimal insulation thereof. Still further, the disclosures do not suggest a compartment at ambient temperature contained within the cooler.

The most basic type of cooler has a single refrigerated compartment comprising an outer casing, a layer of insulation, and an innermost thermally conductive lining. For example, see the disclosures specified in U.S. Pat. No. 307,299 and U.S. Patent Application No. 2002/0060438. Specifically, U.S. Pat. No. 307,299 to Hare discloses such a cooler, but includes a layer of waterproof material between the outer casing and the insulation layer. The waterproof layer prevents the insulation layer from absorbing outside moisture, thereby preventing decay and maintaining the insulation capacity of the material. Likewise, US Patent Application No. 2002/0060438 to Gartner et al. discloses a single refrigerated compartment cooler; but in combination with a stroller for transporting children.

Similarly, other disclosures have set forth a cooler having a single food storage compartment and a vessel for storing a beverage, as set forth in U.S. Pat. Nos. 450,527; 601,798; and 6,474,097. Particularly, U.S. Pat. No. 450,527 to Poyner and U.S. Pat. No. 601,798 to Slomka (herein the '527 patent and the '798 patent, respectively) disclose dual compartment lunch-boxes, comprising a large food compartment and a smaller refreshment vessel enclosed in a container. The '527 patent merely discloses a luncheon box that does not have cooling or insulating properties. The '798 patent discloses a refrigerated lunch-box whereby the food compartment comprises a bottom area for ice and a suspended perforated tray for holding the food items. U.S. Pat. No. 6,474,097 to Treppedi et al. discloses an insulated cooler comprising a single ice food storage compartment, a separate beverage vessel, and a pocket for the storage of spoons and forks recessed in the lid of the container and exposed to the cold therein. These single food storage compartment lunch-boxes with a separate beverage vessel are essentially tantamount to the single food compartment coolers; they share the same disadvantages.

The multi-compartment coolers heretofore devised and utilized generally consist of a plurality of compartments for the storage of food items. Separate compartments are provided for the storage of beverage items. A single lid prevents selective entry, and the compartments are typically cooled exclusively through convection or conduction means alone. These multi-compartment coolers do not provide a cooler with a cooling gradient, or range of temperatures, but only allow a single temperature. U.S. Pat. Nos. 1,895,864; 1,935,307; 4,671,079; 5,509,279; 5,605,056; and 4,286,440. For example, U.S. Pat. No. 1,895,864 to Ricci and U.S. Pat. No. 1,935,307 to Ackerman (hereinafter the '864 patent and the '307 patent) disclose insulated iceboxes to be used in vehicles, including automobile trunks, motorbuses, and airships. The compartment in the '864 patent is cooled through use of convection as the ice is stored in closed metal boxes located on either side of the storage compartment. The compartment in the '307 patent is cooled through use of a centralized compartment housing a motorized refrigeration unit that runs off of engine power.

U.S. Pat. No. 4,671,079 to Petrantoni discloses a container used to cool or heat articles. The container houses an insulated ice chamber that cools the entire container through conduction. U.S. Pat. No. 5,509,279 discloses a portable cooler to be worn on the back. The food compartment is cooled by conduction through a polymeric wall, resulting in only one temperature throughout the food and beverage compartments. U.S. Pat. No. 5,605,056 to Brown et al. discloses a portable cooler with a suspended grate for ice-free storage areas and with multitudes of drawers, but does not provide for isolated compartments at different temperatures. None of these disclosures suggests a cooler having a cooling gradient construction wherein there are isolated, distinct compartments having varying temperatures.

Moreover, even where different compartment temperatures have been disclosed the compartments do not include a broad temperature gradient, and do not disclose differing temperatures for food item compartments; but merely provide a colder temperature for the beverage compartment. U.S. Pat. No. 4,286,440 to Taylor discloses a cooler having a central compartment comprised of a closed coolant container and a compartment for storing food items surrounded by outer compartments for beverages. Continuous circulation of the cold air currents surrounds each of the outer beverage compartments by way of convection. The cooler further comprises two lids. One lid covers the central core and another lid covers the multiple outer compartments containing the beverages. The food compartment (located in the core of the cooler) and the beverage compartment (located on the outer perimeter) are at differing temperatures, whereby the food compartment is warmer than the outer beverage compartments. The cooler disclosed by the '440 patent merely has a single food compartment set at the core temperature, and several beverage storage units surrounding the single food compartment. Beverages are generally best when consumed at ice-cold temperatures. Full emersion directly into the cooling medium is the most efficient way to cool items. A cooling medium based purely on convection is not as efficient in achieving ice-cold temperatures.

Still other multi-compartment coolers heretofore devised and utilized consist of a plurality of compartments for the storage of food items. Separate compartments are provided for the storage of beverage items. A single lid prevents selective entry, and the compartments are typically cooled through direct immersion and convection means alone. Representative of such coolers are those described by U.S. Pat. Nos. 3,591,194; 5,295,369; and 6,193,097.

Specifically, U.S. Pat. No. 3,591,194 to Vega discloses an insulated ice chest cart having a plurality of vertical partitions. The cart is mounted on a pair of wheels and has three compartments. The compartments are not completely insulated from each other, as a lid is shared by at least two of the compartments. Ice can be used in all of the compartments, or in some of the compartments, thereby cooling the other compartments by way of convection. The walls between the compartments have holes for removal of melting ice; hence water from melted ice can seep into the neighboring chambers.

U.S. Pat. No. 5,295,369 to Garcia discloses a single lid water and ice cooler combination comprised of three compartments. Two end compartments house crushed ice, creating a wet section for storage of beverages and a central dry compartment cooled by conduction, for food items. Opening the single lid accesses all compartments of the cooler, thereby decreasing temperatures of stored, cool items. Furthermore, the water and ice cooler combination is not mounted on wheels and is not easy to transport, since tilting or shaking it causes water from the wet region to enter the dry section. U.S. Pat. No. 6,193,097 to Martin discloses a cooler comprised of a plurality of compartments for storing food and beverages. A central compartment contains ice; and the cooler has a single top cover. The central compartment has a drilled hole at the bottom to drain melted ice into the smaller bottom portion wherein the water collects. The outer compartments on either side of the central compartment are dry, but are both maintained at the same temperature through conduction.

For the foregoing reasons, there exists a need in the art for a cooler that comprises a plurality of compartments, at least two of which being dry and one of which is wet. Also needed is a cooler comprising an ice-cold storage compartment that permits full emersion of an item. Further needed is a cooler comprising a dry moderately-cold compartment, and a dry non-cold storage compartment, and which has on its base a plurality of folding wheels for transporting the cooler. It would be highly advantageous if the use of multiple compartments at varying temperatures created a temperature gradient for maintaining temperatures ranging from ice-cold to ambient. It would also be advantageous if the multiple compartments were completely sealed from each other to allow selective entry and thus avoid disturbing the internal temperature of each compartment, while preventing moisture contamination of the dry compartments.

SUMMARY OF THE INVENTION

The present invention provides a compartmentalized, portable cooler having a plurality of compartments, at least two of which are dry and one of which is wet. The cooler comprises an ice-cold storage compartment that permits full emersion of an item. A dry moderately cold compartment, and a dry non-cold storage compartment are included, together with a base connected to a plurality of folding wheels for transporting the cooler. Advantageously, the use of multiple compartments at varying temperatures creates a temperature gradient for maintaining temperatures ranging from ice-cold to ambient. The multiple compartments are completely sealed from each other to allow selective entry and thus avoid disturbing the internal temperature of each compartment, while preventing moisture contamination of the dry compartments.

More specifically, the compartmentalized portable cooler of the present invention comprises a container having insulated exterior walls and at least two partitions for separating the interior of the container into at least three separate compartments. At least one of the separate compartments functions as an ice-cold storage compartment. Another of the separate compartments functions as a dry moderately cold storage compartment. Still another of the separate compartments functions as a dry non-cold storage compartment.

The insulated cooler is further comprised of a thermal conduction pathway extending from the ice-cold storage compartment into the dry moderately cold storage compartment and adjacent to one of the insulated partitions. This thermal pathway's conductivity elements may include, but are not limited to, high thermal conductivity metallic fingers of appropriate cross section, liquid conductivity paths, and/or conduction through an interior cavity within the walls. The insulated cooler of the invention further comprises insulated individual lids for each of the individual compartments hinged to the rear exterior wall of the container to function as a seal to each compartment and to allow selective entry therein. As a result, the container has a multi-compartment gradient cooling construction that allows items to be placed in ice-cold storage, dry moderately cold storage, or dry non-cold storage. Optionally, the insulated cooler comprises a plurality of foldable wheels mounted on the base of the container to facilitate easy transportation thereof.

The ice-cold storage compartment is maintained at low temperatures by a cooling medium added to the ice-cold storage compartment, wherein the cooling medium is selected from the group consisting of block ice, cubed ice, crushed ice, frozen cool packs, or mixtures of ice and salt. Furthermore, the ice-cold storage compartment has a drainage valve located near the bottom of the compartment to remove excess water.

Advantageously, the compartmentalized portable cooler has at least three compartments ranging form ice-cold, moderately cold, to non-cold temperatures forming a temperature gradient construction. The compartments each have their own lid, allowing for complete sealed separation of the compartments enabling selective entry and thereby preventing temperature fluctuations and moister transfer when another compartment is accessed. Temperature gradient construction enables the user to proficiently store food and non-food items of varying water sensitivities and temperature needs.

The ice-cold storage compartment is utilized for storing items which need very cold temperatures and can tolerate wetness as the cooling medium melts. The dry moderately-cold storage compartment is utilized for storing items which need to be dry and do not require very cold temperatures, such as sandwiches, juice, cheese, butter and the like. The dry non-cold compartment is thermally insulated from the cold storage and moderately cooled compartment. It is used for storing dry non-perishable items such as peanut butter, papers, utensils and the like food and non-food items. The cooler is easily portable owing to a plurality of foldable wheels optionally mounted on its base. The foldable wheels facilitate handling and transportation of the cooler.

BRIEF DESCRIPTION OF THE DRAWINGS

The invention will be more fully understood and further advantages will become apparent when reference is had to the following detailed description, appended claims, and accompanying drawings, in which

DESCRIPTION OF THE PREFERRED EMBODIMENTS

In this arrangement, at least three separate compartments are provided with different temperatures and moisture properties forming a cooling gradient, and thereby allowing the user to store items in the most optimal storage conditions. Furthermore, individual lids are included for each compartment, so that accessing one compartment does not result in loss cooling in other compartments. This arrangement also promotes selective accessibility to desired items within the cooler. Perishable items as used herein shall mean those food or non-food items that are best kept at ice-cold or cold temperatures. Moisture sensitive as used herein shall mean items not completely sealed in a watertight package and thereby susceptible to absorbing liquids from the surrounding environment.

Figure 1:
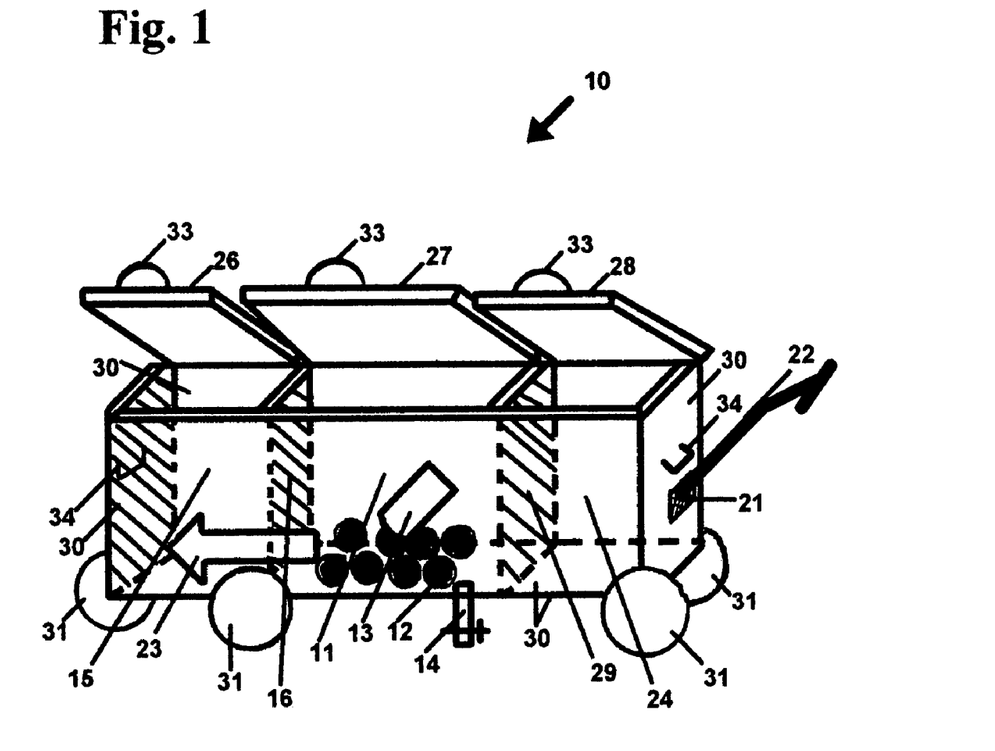
FIG. 1 is a perspective schematic view of the multi-compartment cooler.

A schematic diagram of the compartmentalized cooler is generally shown with at least three compartments at 10 in FIG. 1. Bottom, front, rear, left side and right side insulated exterior walls 30 define the exterior perimeters of the cooler. These insulated exterior walls 30 may be made from a flexible insulating polymer so that the exterior walls 30 can be folded for easy storage when the portable cooler 10 is not in use. An insulated partition 29 separates the interior of cooler into at least two separate compartments, 11 and 24. A dividing wall 16 further separates the interior of the cooler into at least three separate compartments, 15, 11, and 24. This dividing wall 16 may be comprised either an insulating material or a thermal conductive material. The insulated partition 29 and the dividing wall 16 may be made of a flexible insulting polymer along with the exterior walls 30. The use of a flexible polymer allows the exterior walls 30, insulated partition 29, and dividing wall 16 to collapse or fold for convenient storage when the portable cooler 10 is not in use. One of the compartments of the portable cooler is an ice-cold storage compartment 11. Another of the compartments is a dry moderately cold storage compartment 15. A third compartment is a dry non-cold storage compartment 24. The insulated partition 29 completely seals off the dry non-cold storage compartment 24 from the ice-cold storage compartment 11. The insulated partition 29 is made of an insulating material so as to maintain ambient temperatures in the dry non-cold storage compartment while effectively sustaining the ice-cold temperatures of the ice-cold storage compartment 11. The ice-cold storage compartment 11 is maintained at very low temperatures by a cooling medium 12 which can comprise block ice, crushed ice, frozen cool pack(s) or mixtures of ice and salt. In time the cooling medium 12, i.e. ice melts or moisture condensation occurs, produces byproducts causing wetness in the ice-cold storage compartment 11. Food and non-food items 13 contained by the ice-cold storage compartment 11 are those not readily susceptible to damage by wetness. These food and non-food items 13 may include beer and soda cans, and frozen polymer-packaged items. Wetness formation in the ice-cold storage compartment 11 results as a function of time and is determined by the exterior temperature, and the efficiency of insulated exterior walls 30, the insulated partition 29, the dividing wall 16, and the insulating lid located at 27. Optionally, a drainage valve 14 is provided near the bottom of the ice-cold storage compartment 11 to remove excess water therefrom. The ice-cold storage compartment 11 and the moderately cold storage compartment 15 are separated from each other by the dividing wall 16. The ice-cold storage compartment 11 and the dry non-cold storage compartment 24 are insulated from each other by the insulated partition 29. A thermal conduction pathway is provided to transfer cold temperatures from the ice-cold storage compartment 11 to the moderately cold storage compartment 15 by discrete thermal conduction pathways, as shown schematically along the direction of the arrow 23. The ice-cold storage compartment has a lid 27; the moderately cold storage compartment has a lid 26; and the non-cold storage compartment has a lid 28. Each of the lids is hinged to the body of the rear insulated exterior wall 30 and can be opened individually to allow for selective entry into each compartment, 15, 11, and 24, and thereby preventing heating or moisture penetration of other compartments. The dry moderately-cold storage compartment's 15 lid 26 has a handle 33. Lid 27 of the ice-cold storage compartment 11 has a handle 33. The dry non-cold storage compartment's 24 lid 28 has a handle 33. The dry non-cold storage compartment 24 is completely sealed from the other compartments, 15 and 11, and is dry and thermally insulated from the ice-cold storage compartment 11 by the insulated partition 29. This dry non-cold storage compartment 24 can contain non-perishable water sensitive food and non-food items, so as to conveniently store these items in an organized manner. Items suitably stored within compartment 24 include peanut butter, cookies, potato chips, newspaper, dinner plates, cups, and the like. Optionally, foldable wheels 31, preferably five in number, are attached to the bottom insulated exterior wall 30 through axles. These foldable wheels 31 can be folded inwards for easy compact storage. This folding-wheel arrangement is not shown in the drawing. Foldable handles 34 are on the outer surface of the side insulated exterior walls 30 for carrying the cooler. A folding handle 22 is attached to the outer surface of one of the side insulated exterior walls 30 for pulling the cooler and therefore engaging in motion the plurality of foldable wheels 31. The folding handle 22 is attached to the outer surface of the side insulated exterior wall 30 by attachment means 21. Optionally, the outermost surface of the insulated exterior walls 30 may have an outer casing comprised of wicker or wicker like materials.

Figure 2:
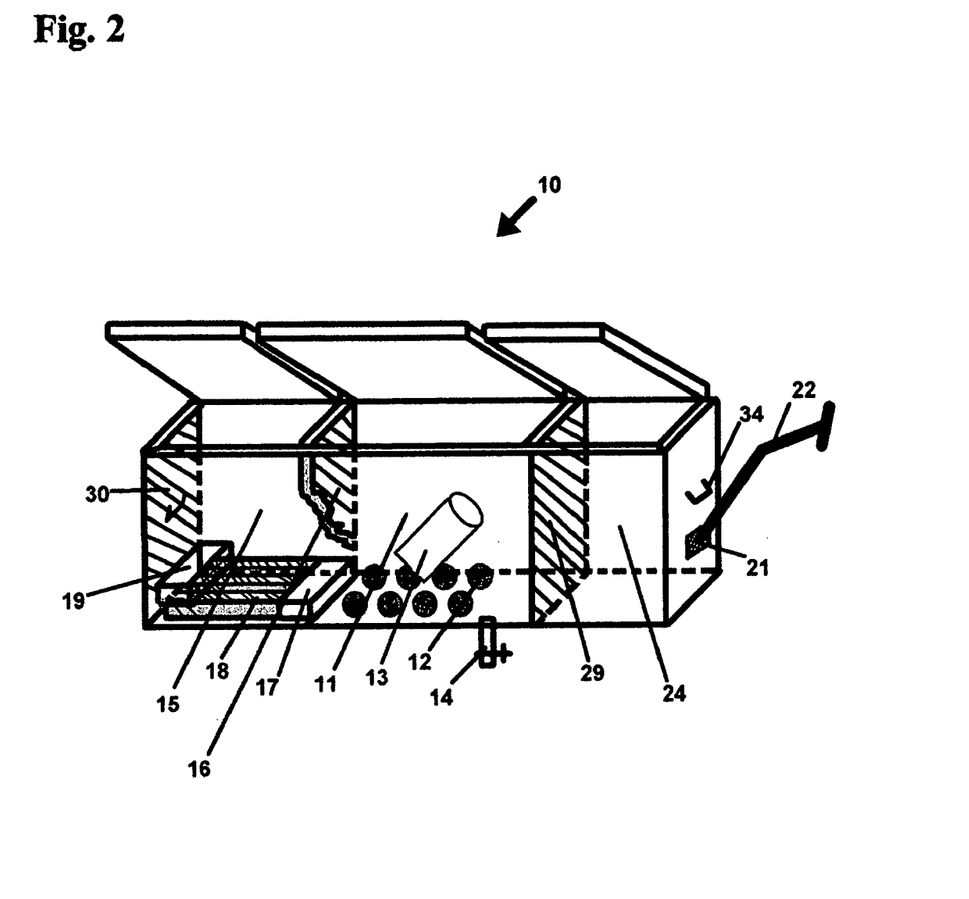
FIG. 2 is a schematic view of the multi-compartment cooler showing the thermal conduction pathway as a heat conducting metal having multiple fingers.

One embodiment of the compartmentalized portable cooler is shown in FIG. 2. Discrete thermal conduction pathways 23 connect the ice-cold storage compartment 11 and moderately cold storage compartment 15. In this embodiment the discrete thermal conduction pathways 23 are comprised of a heat conducting metal bar 17 with multiple sets of fingers 18. This heat conducting metal bar 17 and the multiple sets of fingers 18 are made of heat conducting elements that may include copper, aluminum, iron, steel, tin, or the like. The heat conducting metal bar 17 abuts and runs parallel along the bottom of the ice-cold storage compartment 11 and extends through the dividing wall 16. The multiple sets of fingers 18 run adjacent to the dividing wall 16 and extend from the heat conducting metal bar 17 throughout the length of the dry moderately cold storage compartment 15. These multiple sets of fingers 18 terminate inside the dry moderately cold storage compartment 15 at the side insulated exterior sidewall 30. The total cross sectional area of the multiple sets of fingers 18 determines the amount of cooling transferred to the dry moderately cold storage compartment 15 from the ice-cold storage compartment 11. The heat conducting metal bar 17 and the multiple sets of fingers 18 may be embedded within the insulated polymeric molding of the bottom insulated exterior wall 30 of the cooler. An insulating sheath 19 is, optionally, inserted to limit the exposure of the multiple sets of fingers 18 in the dry moderately-cold storage compartment 15, thereby controlling the amount of cooling provided to the dry moderately-cold storage compartment 15.

Figure 3:
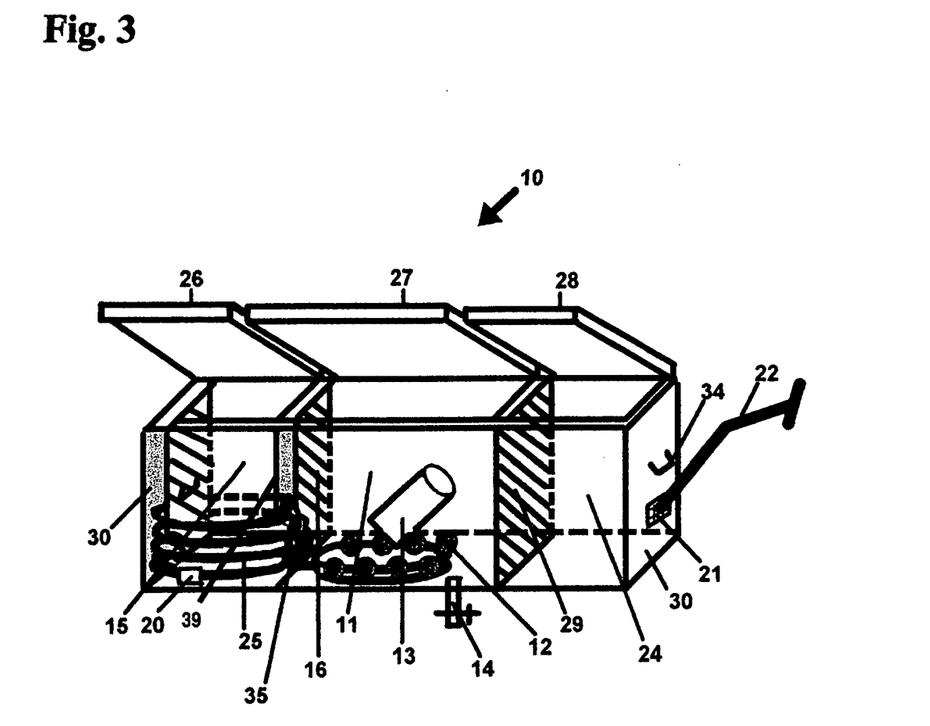
FIG. 3 is a schematic view of another embodiment of the multi-compartment cooler showing the thermal conduction pathway as a closed loop coil containing a liquid medium.

An alternative embodiment of the compartmentalized portable cooler is shown in FIG. 3. In this embodiment, the discrete thermal conduction pathways 23 connect the ice-cold storage compartment 11 and moderately cold storage compartment 15; the discrete thermal conduction pathways 23 are comprised of a closed loop coil 25. The closed loop coil 25 contains a liquid having a freezing point greater than the temperature of the ice-cold storage compartment, and may comprise salt water, ethylene glycol-water mixtures, or alcohol-water mixtures and the like. Such fluids are preferably selected from those fluid candidates likely to remain in the liquid state at the temperatures extant within the cold storage compartment 11. The closed loop coil 25 is immersed in the cooling medium 12 in the ice-cold storage compartment 1, whereby the heat of the liquid in the closed loop coil 25 is absorbed by the cooling medium 12 and the entirety of the liquid in the closed loop coil 25 is cooled through convection. The closed loop coil 25 extends from the bottom of the ice-cold storage compartment 11 and passes through the dividing wall 16 and into the moderately cold storage compartment 15. Where the closed loop coil 25 extends into the dry moderately-cold storage compartment 15 the closed loop coil 25 partitions into several loops. The closed loop coil 25 partitions into several loops and extends into the exterior insulated walls 30 and the dividing wall 16 thereof. The dividing wall 16 has a thermally conductive inner-casing wall 39 inside the moderately cold storage compartment 15. Cooling action is produced by thermal conduction through the dividing wall 16 and the conductive inner-casing wall 39 by the convection currents within the closed loop coil 25. These convection currents are caused by the thermal gradients between the ice-cold storage compartment 11 and the moderately cold storage compartment 15. A valve 20 may be interposed to control the convection flow current in the closed loop coil 25, and hence the degree of cooling provided to the moderately cold storage compartment 15.

Figure 4:
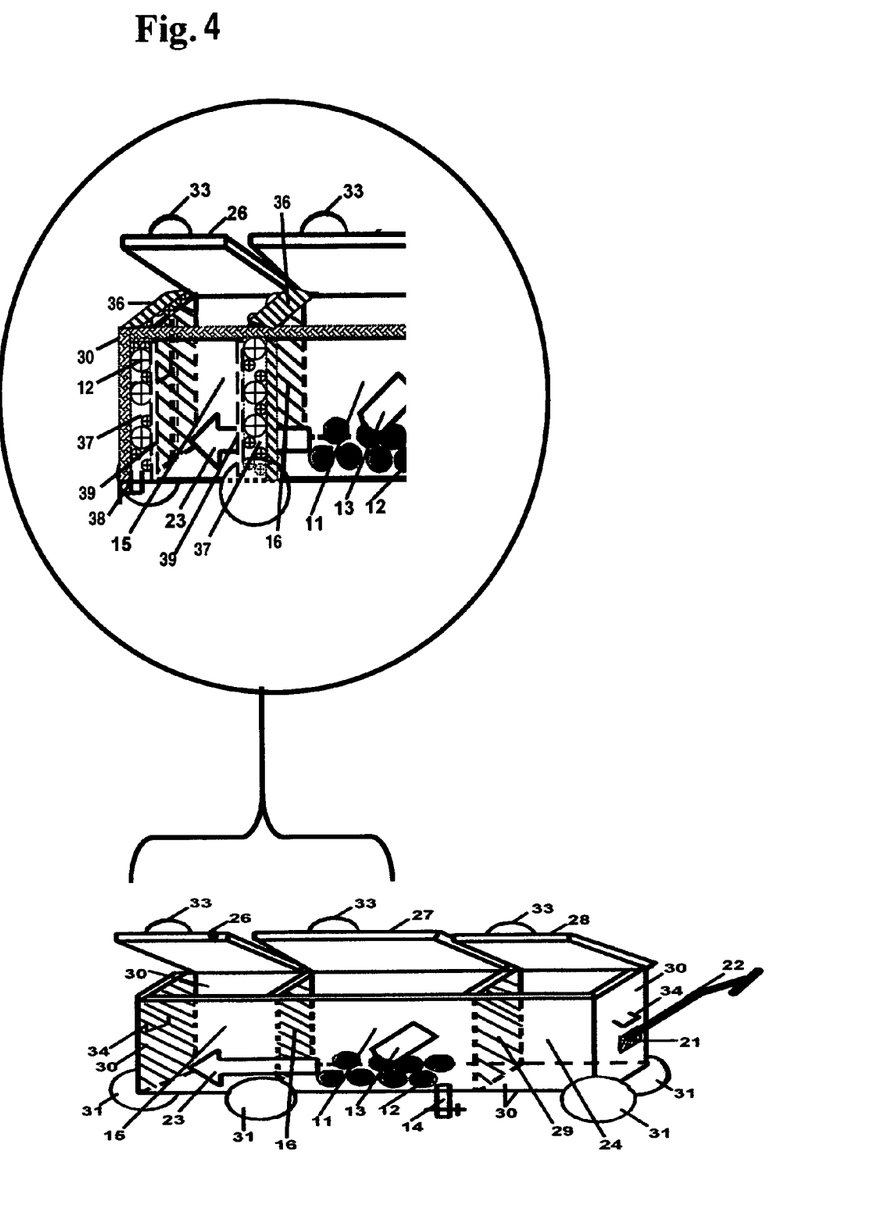
FIG. 4 is a schematic view of another embodiment of the multi-compartment cooler showing the thermal conduction pathway as an interior cavity containing an added cooling medium.

Another alternative embodiment of the compartmentalized portable cooler is shown in FIG. 4. In this embodiment, the discrete thermal conduction pathways 23 are comprised of an interior cavity 37 containing an added cooling medium 12. The interior cavity 37 extends throughout the perimeters of the dry moderately-cold storage compartment 15. Specifically, the interior cavity 37 extends along the insulated exterior walls 30 (side, front, and/or rear) of the dry moderately-cold storage compartment. This interior cavity 37 is formed by a gap between the insulated exterior wall(s) 30 (side, front, and/or rear) and a thermally conductive inner-casing wall 39. This inner-casing wall 39 extends along the inner-most perimeters of the dry moderately-cold storage compartment 15. The inner-casing wall 39 continues to extend along the dividing wall 16 and thereby extends the interior cavity 37 therein. The inner-casing wall 39 of the dry moderately-cold storage compartment 15 is comprised of a thermally conductive material so that conduction between the interior cavity 37 and the dry moderately-cold storage compartment 15 results. A cooling medium 12 is added to the interior cavity 37. The cooling medium 12 comprises block ice, crushed ice, frozen cool pack(s) or mixtures of ice and salt. Optionally, a drainage valve 38 is included for removal of byproducts of the cooling medium 12 from the interior cavity 37. The addition of cooling medium 12 into the interior cavity 37 can either act unilaterally in cooling the moderately cold storage compartment 15 or in combination with the other thermal conduction pathways 23 set forth in FIGS. 2 and 3. The dividing wall 16 is optionally comprised of an insulating material in order to decrease the amount of conductivity between the ice-cold storage compartment 11 and the dry moderately-cold storage compartment 15, preventing the latter from reaching ice-cold temperatures. Optionally, the dividing wall 16 may be comprised of a thermally conductive material. In any event, the inner-casing wall 39 is comprised of a thermally conductive material. The interior cavity 37 has lids 36 to allow entry therein. These lids 36 are constructed to form a seal when closed, preventing moisture accumulated within the interior cavity 37 from seeping or penetrating into the dry moderately-cold storage compartment 15. Furthermore, these lids 36 are comprised of an insulating material to maintain the temperature within the interior cavity 37.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. An insulated portable cooler, comprising:
   a. bottom, front, rear, left-side and right-side insulated exterior walls defining a container;
   b. insulated partition means for separating the interior of said container into at least two separate compartments;
   c. dividing wall means for separating the interior of said container into at least three separate compartments;
   d. at least one of said separate compartments functioning as an ice-cold storage compartment;
   e. at least one of said separate compartments functioning as a dry moderately-cold storage compartment;
   f. at least one of said separate compartments functioning as a dry non-cold storage compartment;
   g. thermal conduction pathways located on the bottom of said container extending from the ice-cold storage compartment into the dry moderately-cold storage compartment and adjacent to the dividing wall; and
   h. insulated individual lid means associated with each of the three separate compartments, said insulated lid means comprising a plurality of lids hinged to the rear exterior wall of the container and being operative to individually seal each compartment and allow selective entry therein;
   wherein the container has a multi-compartment gradient cooling construction that allows perishable and non-perishable food and non-food items to be stored at ice-cold, dry moderately cold, or dry non-cold temperatures.

2. An insulated portable cooler as recited by claim 1, wherein the ice-cold storage compartment is cooled by an added cooling medium, said cooling medium being selected from the group consisting of block ice, cubed ice, crushed ice, frozen cool packs, and mixtures of ice and salt.

3. An insulated portable cooler as recited by claim 1, wherein the ice-cold storage compartment is used for storage of non-water sensitive food items that require ice-cold temperatures and are fully immersed in the cooling medium.

4. An insulated portable cooler as recited by claim 1, wherein the ice-cold storage compartment has a drainage valve located near the bottom of the compartment to remove excess water therefrom.

5. An insulated portable cooler as recited by claim 1, wherein the thermal conduction pathway comprises a heat conducting metal comprised of copper, aluminum, iron, steel, or tin.

6. An insulated portable cooler as recited by claim 5, wherein said heat conducting metal comprises a bar and multiple fingers extending from the bottom of the ice-cold storage compartment and through the dividing wall of the moderately-cold storage compartment, and wherein the total cross sectional area of the said multiple fingers determines the amount of cooling transferred to the moderately-cold storage compartment.

7. An insulated portable cooler as recited by claim 5, wherein said heat conducting metal is covered by an insulating sheath, and said insulating sheath extends over the heat conducting metal.

8. An insulated portable cooler as recited by claim 1, wherein the thermal conduction pathway comprises a closed loop coil containing a liquid medium, wherein the coil extends from the bottom of said ice-cold storage compartment and into the dry moderately-cold storage compartment, said coil further extending up into the exterior insulated walls and the dividing wall of the dry moderately-cold storage compartment, wherein the dividing wall has a conductive inner-casing wall surface in the moderately cold storage compartment, and said cooling action being produced by thermal conduction through the coil material and convection currents within the closed loop coil.

9. An insulated portable cooler as recited by claim 8, wherein said closed loop coil contains a liquid having a freezing point greater than the temperature of the central storage compartment and may be comprised of salt water, ethylene glycol-water mixtures, or alcohol-water mixtures.

10. An insulated portable cooler as recited by claim 8, wherein the closed loop coil is attached to a valve, the valve being interposed to control the convection flow current and the degree of cooling provided to the moderately-cold storage compartment.

11. An insulated portable cooler as recited by claim 1, wherein the dry non-cold storage compartment is completely insulated and dry, and is used to store non-food items and food items that are moisture sensitive and/or do not require cool temperatures.

12. An insulated portable cooler as recited by claim 1, wherein the thermal conduction pathway comprises an interior cavity extending along at least two walls comprising the moderately cold storage compartment, the interior cavity extends along the inner perimeter of at least one of the dry moderately-cold storage compartment's insulated exterior walls, a thermally conductive inner-casing wall extends along the inner-most perimeters of said interior cavity so that the interior cavity is located between the inner-casing wall and the insulated exterior wall(s), and said interior cavity and thermally conductive inner-casing wall extend along the dividing wall of the dry moderately-cold storage compartment.

13. An insulated portable cooler as recited by claim 12, wherein said interior cavity has at least one entry lid so that cooling medium can be added thereto, said cooling medium being selected from the group consisting of block ice, cubed ice, crushed ice, frozen cool packs, and mixtures of ice and salt.

14. An insulated portable cooler as recited by claim 12, wherein the interior cavity has a drainage valve.

15. An insulated portable cooler as recited by claim 1, wherein the side insulated exterior walls include foldable handles for lifting and carrying said cooler.

16. An insulated portable cooler as recited by claim 1, wherein there is a plurality of foldable wheels mounted on the bottom of the container to facilitate transportation thereof.

17. An insulated portable cooler as recited by claim 16, wherein said plurality of foldable wheels consists of five wheels that are attached to the main body of the container through axles, said wheels being adapted by spring folding means to fold inwards for easy storage.

18. An insulated portable cooler as recited by claim 1, further comprising a foldable handle attached to one of the side insulated exterior walls for pulling means.

19. An insulated portable cooler as recited by claim 1, wherein the insulated exterior walls, the insulated partition, and the dividing wall are comprised of an insulated flexible polymeric material to allow said cooler to collapse for convenient storage when not in use.

20. An insulated portable cooler as recited by claim 1, wherein the outermost exterior of the cooler is a wicker outer casing with insulated exterior walls.

21. An insulated portable cooler as recited by claim 1, wherein the thermal conduction pathway comprises both an interior cavity extending along at least two walls comprising the moderately cold storage compartment and a heat conducting metal bar with multiple fingers extending into the moderately cold storage compartment.

22. An insulated portable cooler as recited by claim 1, wherein the thermal conduction pathway comprises both an interior cavity extending along at least two walls comprising the moderately cold storage compartment and a closed loop coil containing a liquid medium, the coil extends from the bottom of said ice-cold storage compartment and into the dry moderately-cold storage compartment, said coil further extends up into the exterior insulated walls and the dividing wall of the dry moderately-cold storage compartment, and the dividing wall has a conductive inner-casing wall surface in the moderately cold storage compartment.

* * * * *